(12) United States Patent
Rocklin et al.

(10) Patent No.: US 6,484,508 B2
(45) Date of Patent: Nov. 26, 2002

(54) METHODS FOR OPERATING GAS TURBINE ENGINES

(75) Inventors: Mark Stephen Rocklin, Wyoming, OH (US); Nicholas Damlis, Cincinnati, OH (US); Curtis Lee Brown, Cincinnati, OH (US); Robert Paul Coleman, Fairfield, OH (US); James William Stegmaier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 09/899,714

(22) Filed: Jul. 5, 2001

(65) Prior Publication Data

US 2001/0039794 A1 Nov. 15, 2001

Related U.S. Application Data

(63) Continuation-in-part of application No. 09/354,275, filed on Jul. 15, 1999.
(60) Provisional application No. 60/094,094, filed on Jul. 24, 1998.

(51) Int. Cl.$^7$ .................................................. F02C 3/30

(52) U.S. Cl. ........................................................ 60/775

(58) Field of Search ....................... 60/775, 39.3, 39.53

(56) References Cited

U.S. PATENT DOCUMENTS

| | | |
|---|---|---|
| 2,115,338 A | 4/1938 | Lysholm |
| 2,625,012 A | 1/1953 | Larrecq |
| 2,678,531 A | 5/1954 | Miller |
| 2,686,631 A | 8/1954 | Jordan |
| 2,874,537 A | 2/1959 | Scarborough et al. |
| 4,101,073 A | 7/1978 | Curran |
| 4,196,020 A | 4/1980 | Hornak et al. |
| 4,301,649 A | 11/1981 | Walker |
| 4,448,018 A | 5/1984 | Sayama et al. |
| 4,711,084 A | 12/1987 | Brockett |
| 4,896,499 A | 1/1990 | Rice |
| 4,949,544 A | 8/1990 | Hines |

(List continued on next page.)

FOREIGN PATENT DOCUMENTS

| | | |
|---|---|---|
| DE | 2931178 | 2/1981 |
| DE | 4442936 | 6/1996 |
| EP | 0770771 | 5/1997 |
| EP | 0781909 | 7/1997 |
| EP | 0859135 | 8/1998 |
| EP | 0889212 | 1/1999 |
| EP | 0924410 | 6/1999 |
| FR | 1007140 | 5/1952 |
| FR | 286978 | 3/1953 |
| GB | 1093682 | 12/1967 |
| IT | 605502 | 6/1960 |
| WO | WO98/48159 | 10/1998 |
| WO | WO99/67519 | 12/1999 |

OTHER PUBLICATIONS

"SPS boosting hot day output by injecting water into compressor" by Robert Farmer, *Gas Turbine World*, pp. 35–37, Mar.–Apr. 1999.
Advertisement folder for LM6000 Sprint, GE Industrial AeroDerivatives, One Neumann Way S–158, Cincinnati, OH 45215–6301.

*Primary Examiner*—Ehud Gartenberg
(74) *Attorney, Agent, or Firm*—William Scott Andes; Armstrong Teasdale LLP

(57) ABSTRACT

A method is provided for operating a gas turbine engine that includes a high pressure compressor and a water injection apparatus for injecting water into a flow of the engine upstream from the high pressure compressor. The method includes the steps of operating the engine without injecting water into the gas flow of the engine, injecting water at a first flow rate into the gas flow for power augmentation once engine full power is about reached, and injecting water into the engine at an increased second flow rate for evaporative cooling of engine components downstream from the high pressure compressor.

17 Claims, 11 Drawing Sheets

U.S. PATENT DOCUMENTS

| | | |
|---|---|---|
| 4,984,426 A | 1/1991 | Santi |
| 4,991,391 A | 2/1991 | Kosinski |
| 5,011,540 A | 4/1991 | McDermott |
| 5,150,567 A | 9/1992 | Farrell |
| 5,331,806 A | 7/1994 | Warkentin |
| 5,390,646 A | 2/1995 | Swenson |
| 5,463,873 A | 11/1995 | Early et al. |
| 5,525,268 A | 6/1996 | Reens |
| 5,535,584 A | 7/1996 | Janes |
| 5,553,448 A | 9/1996 | Farrell et al. |
| 5,577,378 A | 11/1996 | Althaus et al. |
| 5,581,997 A | 12/1996 | Janes |
| 5,622,044 A | 4/1997 | Bronicki et al. |
| 5,669,217 A | 9/1997 | Anderson |
| 5,867,977 A | 2/1999 | Zachary et al. |
| 5,930,990 A | 8/1999 | Zachary et al. |
| 6,012,279 A | 11/2000 | Hines |
| 6,216,443 B1 * | 4/2001 | Utamura .................. 181/214 |
| 6,260,350 B1 * | 7/2001 | Horii et al. ................ 60/39.3 |

* cited by examiner

| NOZZLE | DROP SIZE RR (μm) | PERCENT EVAP. IN DUCT | DROP SIZE AT HP INLET RR (μm) | PERCENT DEP. ON HP INLET VANES | LOCATION OF COMPLETE EVAP. |
|---|---|---|---|---|---|
| 1. PRESS. AT. AT 3000 PSI | 23 | 28 | 22 | 88 | AT HP COMP. DISCH** |
| 2. PRESS. AT. AT 3000 PSI | 26* | 21 | 24.5 | 91 | −7% THROUGH HP |
| 3. AIR AT. AT −22 SCFM | 14.5 | 41 | 14 | 66 | 11th STAGE OF HP |
| 4. AIR AT. AT −33 SCFM | 10.5 | 51 | 9.9 | 30 | 7th STAGE OF HP |
| 5. AIR AT. AT −45 SCFM | 7.5 | 76 | 6.5 | NEGT | 3rd STAGE OF HP |

FIG. 15

METHODS FOR OPERATING GAS TURBINE ENGINES

CROSS-REFERENCE TO RELATED APPLICATIONS

This application is a continuation-in-part of U.S. patent application Ser. No. 09/354,275 filed Jul. 15, 1999 which claims the benefit of U.S. Provisional Patent Application Ser. No. 60/094,094, filed Jul. 24, 1998.

BACKGROUND OF THE INVENTION

This invention relates generally to gas turbine engines and more particularly, to prebooster and precompressor water injection in a gas turbine engine.

Gas turbine engines typically include a compressor for compressing a working fluid, such as air. The compressed air is injected into a combustor which heats the fluid causing it to expand, and the expanded fluid is forced through a turbine. The compressor typically includes a low pressure compressor and a high pressure compressor.

The output of known gas turbine engines may be limited by the temperature of the working fluid at the output of the high pressure compressor, sometimes referred to as temperature "T3", and by the temperature of the working fluid in the combustor outlet, sometimes referred to as temperature "T41". To reduce both the T3 and T41 temperatures, at least some known engines use an intercooler positioned in the fluid flow path between the low pressure compressor and the high pressure compressor. In steady state operation, the intercooler extracts heat from the air compressed in the low pressure compressor, which reduces both the temperature and volume of air entering the high pressure compressor. Such reduction in temperature reduces both the T3 and T41 temperatures. Increased power output therefore can be achieved by increasing flow through the compressor. However, such an intercooler may also reduce thermal efficiency of the engine.

To facilitate reducing both the T3 and T41 temperatures for power augmentation, without sacrificing engine thermal efficiency, at least some known engines include prebooster or precompressor water injection. The water spray facilitates reducing both the T3 and T41 temperatures, and also reduces compressive engine horsepower. Because the T3 and T41 temperatures are reduced, the engine is not T3 and T41 constrained, the engine may operate at higher output levels below the T3 and T41 temperature limits.

BRIEF SUMMARY OF THE INVENTION

In one aspect, a method for operating a gas turbine engine including a high pressure compressor and a water injection apparatus for injecting water into a flow of the engine upstream from the high pressure compressor is provided. The method includes the steps of operating the engine without injecting water into the gas flow of the engine, injecting water at a first flow rate into the gas flow for power augmentation once engine full power is about reached, and injecting water into the engine at an increased second flow rate for evaporative cooling of engine components downstream from the high pressure compressor.

In another aspect of the invention, a method for operating a gas turbine engine is provided. The method includes the steps of injecting water into the gas flow at a first flow rate for power augmentation once engine full power is about reached, accelerating the engine to full power while water is injected at the first flow rate, and injecting water at a second flow rate into the engine for evaporative cooling of engine components while the engine is maintained at a substantially constant operating power.

In a further aspect, a method for operating an engine including a high pressure compressor and a water injection system including a plurality of nozzles is provided. The method includes the steps of operating the engine at full power without injecting water into the gas flow of the engine, injecting water through the nozzles into the gas flow at a first flow rate for power augmentation once engine full power is about reached, accelerating the engine to full power while water is injected at the first flow rate, and injecting water at a second flow rate through the nozzles into the engine for evaporative cooling of engine components while the engine is maintained at a substantially constant operating power, wherein the second flow rate is at least approximately five percent greater than a corresponding water injection first flow rate used for power augmentation.

BRIEF DESCRIPTION OF THE DRAWINGS

FIG. 15 is a chart illustrating an exemplary water schedule for increasing power output from the engine arrangement shown in FIG. 8.

DETAILED DESCRIPTION OF THE INVENTION

Set forth below are exemplary configurations of water spray injection in accordance with various embodiments of the present invention. Initially, it should be understood that although specific implementations are illustrated and described, water spray injection can be practiced using many alternative structures and in a wide variety of engines. In addition, and as described below in more detail, water spray injection can be performed at the inlet of a high pressure compressor, at an inlet of the booster, or at both locations.

Water spray injection provides many of the same advantages of intercooling yet overcomes some shortcomings of intercooling. For example, and with intercooling, the heated water (or air) is removed and removal of such heated water (or air) reduces the thermal efficiency of the cycle as well as creates environmental concerns. The significant power increase provided by intercooling typically overcomes the shortcomings associated with intercooling and as a result, intercooling often is utilized when extra power is required using a different or larger airflow booster and a larger high pressure turbine flow function. Water spray injection, as described below, provides a power increase which may be somewhat less than the maximum power increase provided in a similarly situated intercooler. Furthermore, water spray injection also provides evaporative cooling of engine components. With water spray injection, however, far less water is utilized and water exits the cycle as water vapor at exhaust gas temperature.

Figure 1:
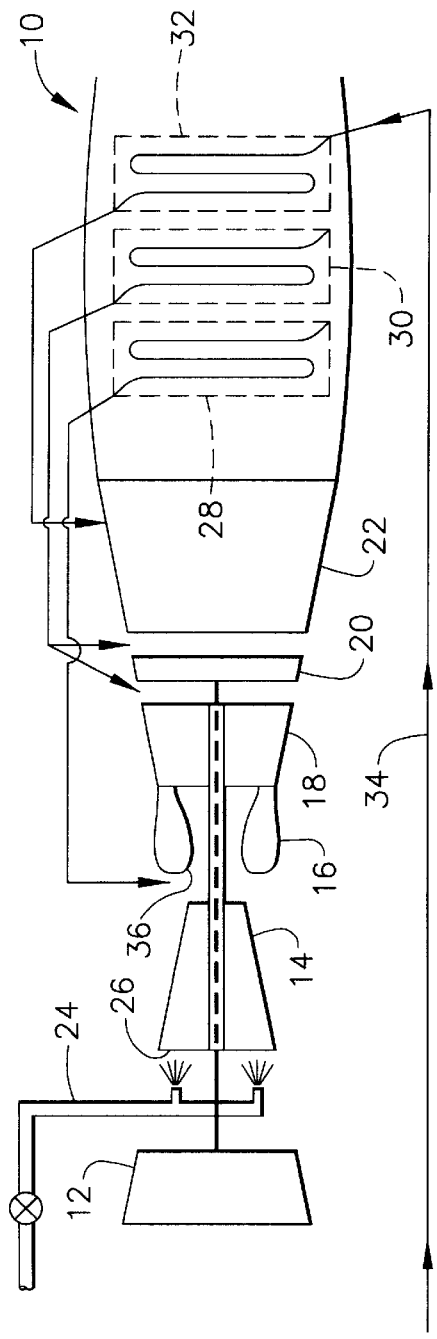
FIG. 1 is an exemplary schematic illustration of a gas turbine engine including compressor water injection in accordance with one embodiment of the present invention.

Referring now specifically to the drawings, FIG. 1 is a schematic illustration of a gas turbine engine 10 which, as is well known, includes a low pressure compressor 12, a high pressure compressor 14, and a combustor 16. Engine 10 also includes a high pressure turbine 18, a low pressure turbine 20, and a power turbine 22. Engine 10 further includes a water injection apparatus 24 for injecting water into an inlet 26 of high pressure compressor 14. Further details regarding water injection apparatus 22 are set forth below. For purposes of FIG. 1, however, it should be understood that apparatus 24 is in flow communication with a water supply (not shown) and water is delivered from such supply through apparatus 24 to inlet 26 of compressor 14. Apparatus 24 is air aspirated using a bleed source off compressor 14 to provide a finer spray mist. Waste heat boilers 28, 30, and 32 are located downstream of power turbine 22. As is known in the art, feed water is supplied to boilers 28, 30, and 32 via a feedwater line 34, and water in the form of steam is communicated from boilers 28, 30, and 32 to various upstream components. Particularly, steam from boiler 28 is provided to an inlet 36 of combustor 16, steam from boiler 30 is provided to an inlet of low pressure turbine 20 and an inlet of power turbine 22, and steam from boiler 32 is provided to a last stage of power turbine 22. Except for water spray injection apparatus 24, the various components of turbine 10 are known in the art.

In operation, air flows through low pressure compressor 12, and compressed air is supplied from low pressure compressor 12 to high pressure compressor 14. In addition, a water spray is supplied to inlet 26 of high pressure compressor 14, and the water spray enters into compressor 14 through inlet 26. Due to the high temperature environment at the location at which the water spray is injected, the water spray partially evaporates before entering high pressure compressor 14. The water spray cools the air flow in high pressure compressor 14 for at least each stage of compressor 14 through which such spray flows, i.e., until it evaporates. Usually by the sixth stage of compressor 14, the water spray is totally evaporated.

The air is further compressed by high pressure compressor 14, and highly compressed air is delivered to combustor 16. Airflow from combustor 16 drives high pressure turbine 18, low pressure turbine 20, and power turbine 22. Waste heat is captured by boilers 28, 30, and 32, and the waste heat steam is delivered to upstream components coupled to boilers 28, 30 and 32 as described above.

The water particles from water spray apparatus 24 provide the advantage that the temperature of the airflow at the outlet of high pressure compressor 14 (temperature T3) and the temperature of the airflow at the outlet of combustor 16 (temperature T41) are reduced as compared to such temperatures without the spray. Specifically, the water spray extracts heat from the hot air flowing into and through compressor 14, and by extracting such heat from the air flow, the T3 and T41 temperatures are reduced along with the required compressor power. Reducing the T3 and T41 temperatures provides the advantage that engine 10 is not T3 and T41 constrained, and therefore, engine 10 may operate at higher output levels by throttle pushing than is possible without such water spray. In addition to increased power output, water spray injection as described above provides the advantage of less water consumption as compared to intercooling under the same conditions. Furthermore, as described below, additional water injected from water spray apparatus 24 beyond the water required for power augmentation also provides the advantage of evaporative intercooling of engine 10, such that the T3 temperature operating limit is substantially eliminated from engine operation requirements. More specifically, as described in more detail below, evaporative cooling of engine 10 facilitates reducing high pressure compressor flow path temperatures, while maintaining approximately the same overall engine flow path temperature profile. The decreased cooling temperature is then used to reduce engine component temperatures, thus facilitating extending a useful life of such components.

Figure 2:
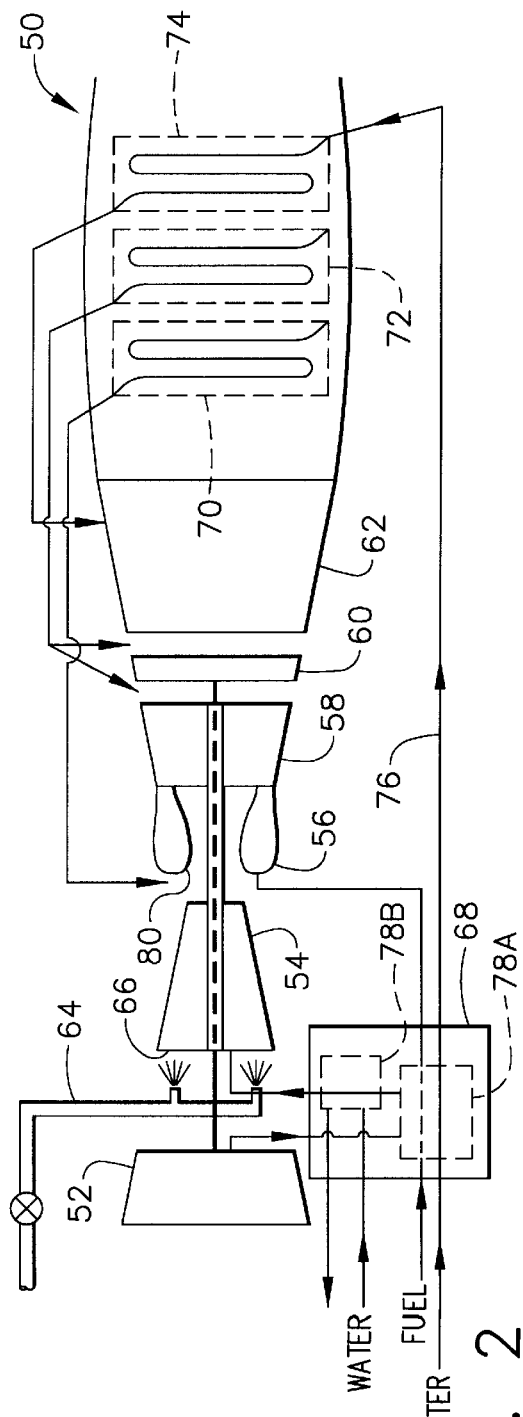
FIG. 2 is an exemplary schematic illustration of a gas turbine engine including compressor water injection and intercooling in accordance with another embodiment of the present invention.

FIG. 2 is a schematic illustration of another embodiment of a gas turbine engine 50 including water spray injection. Engine 50 includes a low pressure compressor or booster 52, a high pressure compressor 54, and a combustor 56. Engine 50 also includes a high pressure turbine 58, a lower pressure turbine 60, and a power turbine 62. Engine 50 further includes a water injection apparatus 64 for injecting water into an inlet 66 of high pressure compressor 54. For purposes of FIG. 2, it should be understood that apparatus 64 is in flow communication with a water supply (not shown) and water is delivered from such supply through apparatus 64 to inlet 66 of compressor 54. An intercooler 68 also is positioned in series flow relationship with booster 52 to receive at least a portion or all of the air flow output by booster 52, and the output of intercooler 68 is coupled to inlet 66 of compressor 54. Of course, cooling water is supplied to intercooler 68 as illustrated or blower fans could be used for air cooling. Intercooler 68 could, for example, be one of the intercoolers described in U.S. Pat. No. 4,949,544.

Waste heat boilers 70, 72, and 74 are located downstream of power turbine 62. As is known in the art, feed water is supplied to boilers 70, 72, and 74 via a feedwater line 76 which extends through a first stage 78A of intercooler 68, and steam is communicated from boilers 70, 72, and 74 to various upstream components. Particularly, steam from boiler 70 is provided to an inlet 80 of combustor 56, steam from boiler 72 is provided to an inlet of low pressure turbine 60 and an inlet of power turbine 62, and steam from boiler 74 is provided to a last stage of power turbine 62. Except for water spray injection apparatus 64, the various components of turbine 50 are known in the art.

In operation, air flows through low pressure compressor 52, and compressed air is supplied from low pressure compressor 52 to high pressure compressor 54. At least some or all compressed air from low pressure compressor 52 is diverted to flow through a second stage 78B of intercooler 68, and such diverted air is cooled and supplied to inlet 66 of high pressure compressor 54. In addition, a water spray is supplied to inlet 66 of high pressure compressor 54, and the water spray enters into compressor 54 through inlet 66. Due to the higher temperature environment at the location at which the water spray is injected, the water spray partially evaporates before entering high pressure compressor 54. The water spray cools the air flow in high pressure compressor 54 for at least each stage of compressor 54 through which such spray flows, i.e., until it evaporates. Usually by the sixth stage of compressor 54, the water spray is evaporated.

The air is further compressed by high pressure compressor 54, and highly compressed air is delivered to combustor 56. Airflow from combustor 56 drives high pressure turbine 58, low pressure turbine 60, and power turbine 62. Waste heat is captured by boilers 70, 72, and 74, and the waste heat as steam is delivered to upstream components coupled to boilers 70, 72, and 74 as described above.

Figure 3:
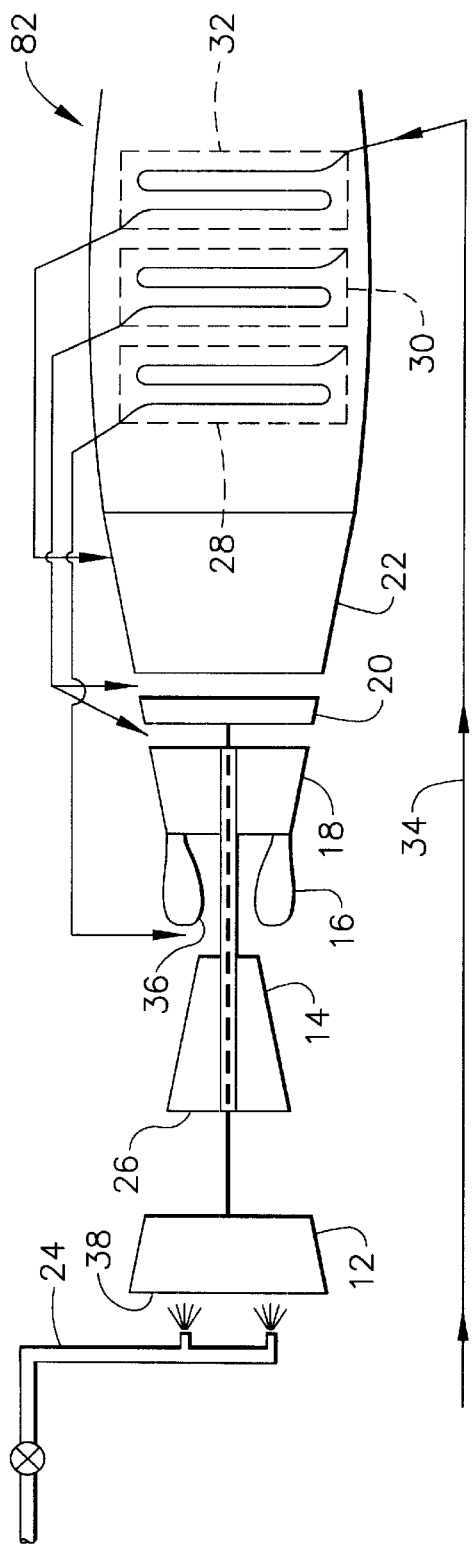
FIG. 3 is an exemplary schematic illustration of a gas turbine engine including booster water injection in accordance with one embodiment of the present invention.

Although not shown in the exemplary configuration set forth in FIG. 2, it is contemplated that rather than, or in addition to, water spray injection at inlet 66 of high pressure compressor 54, such injection can be performed at the inlet of low pressure compressor, or booster, 52 (booster water spray injection is illustrated in FIG. 3).

An exemplary configuration of an engine 82 including booster water spray injection is set forth in FIG. 3. The configuration of engine 82 is substantially similar to engine 10 shown in FIG. 1 with the exception that water spray injection apparatus 24 is located at an inlet 38 of low pressure compressor, or booster, 12. In engine 82, water is injected into booster 12 and cools the air flowing through booster 12.

Figure 4:
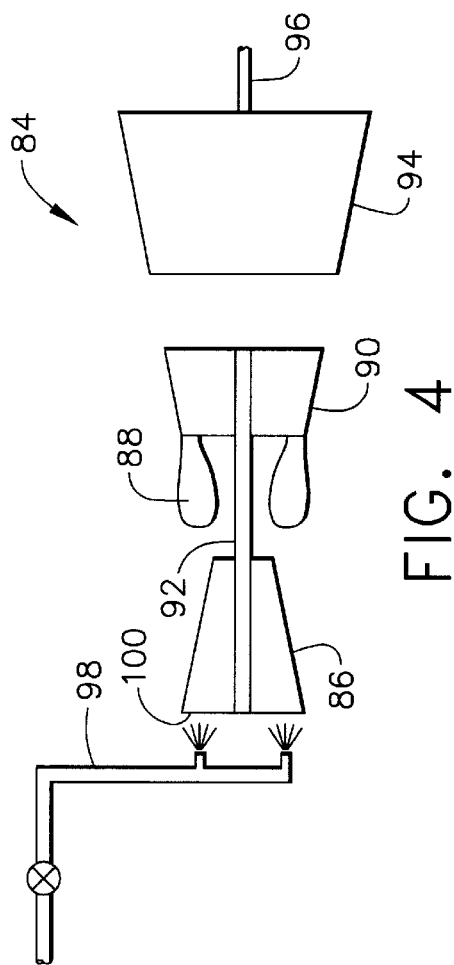
FIG. 4 is an exemplary schematic illustration of a single rotor gas turbine engine including compressor water injection in accordance with another embodiment of the present invention.

FIG. 4 is an exemplary schematic illustration of a single rotor gas turbine engine 84 including compressor water injection in accordance with another embodiment of the present invention. Engine 84 includes a high pressure compressor 86, a combustor 88, and a high pressure turbine 90. A shaft 92 coupled high pressure compressor 86 and high pressure turbine 90. A power turbine 94 is downstream from high pressure turbine 90, and a shaft 96 is coupled to and extends from power turbine 94. Water spray injection apparatus 98 is located at an inlet 100 of high pressure compressor 86.

Figure 5:
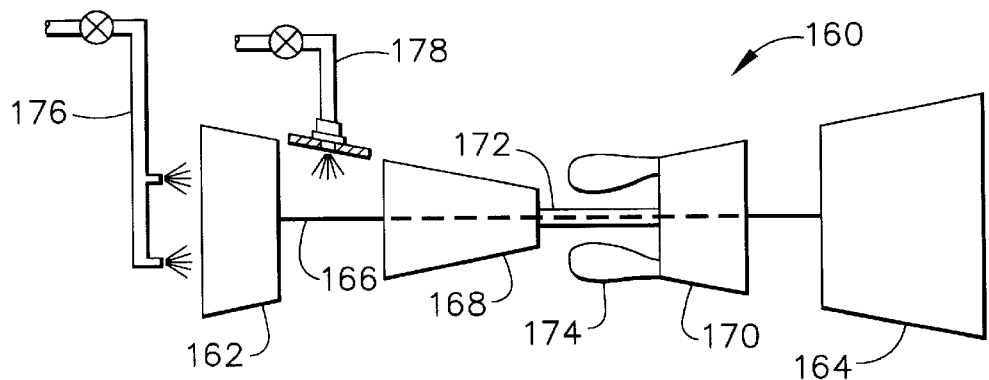
FIG. 5 is an exemplary schematic illustration of a gas turbine engine including booster and compressor water injection in accordance with still yet another embodiment of the present invention.

A dual rotor gas turbine engine 10 is shown schematically in FIG. 5. Engine 160 includes a booster 162 and a power turbine 164 connected by a first shaft 166, a high pressure compressor 168 and a high pressure turbine 170 connected by a second shaft 172, and a combustor 174. Engine 160 further includes pre-booster water spray injection apparatus 176 and pre-compressor water spray injection apparatus 178.

Figure 6:
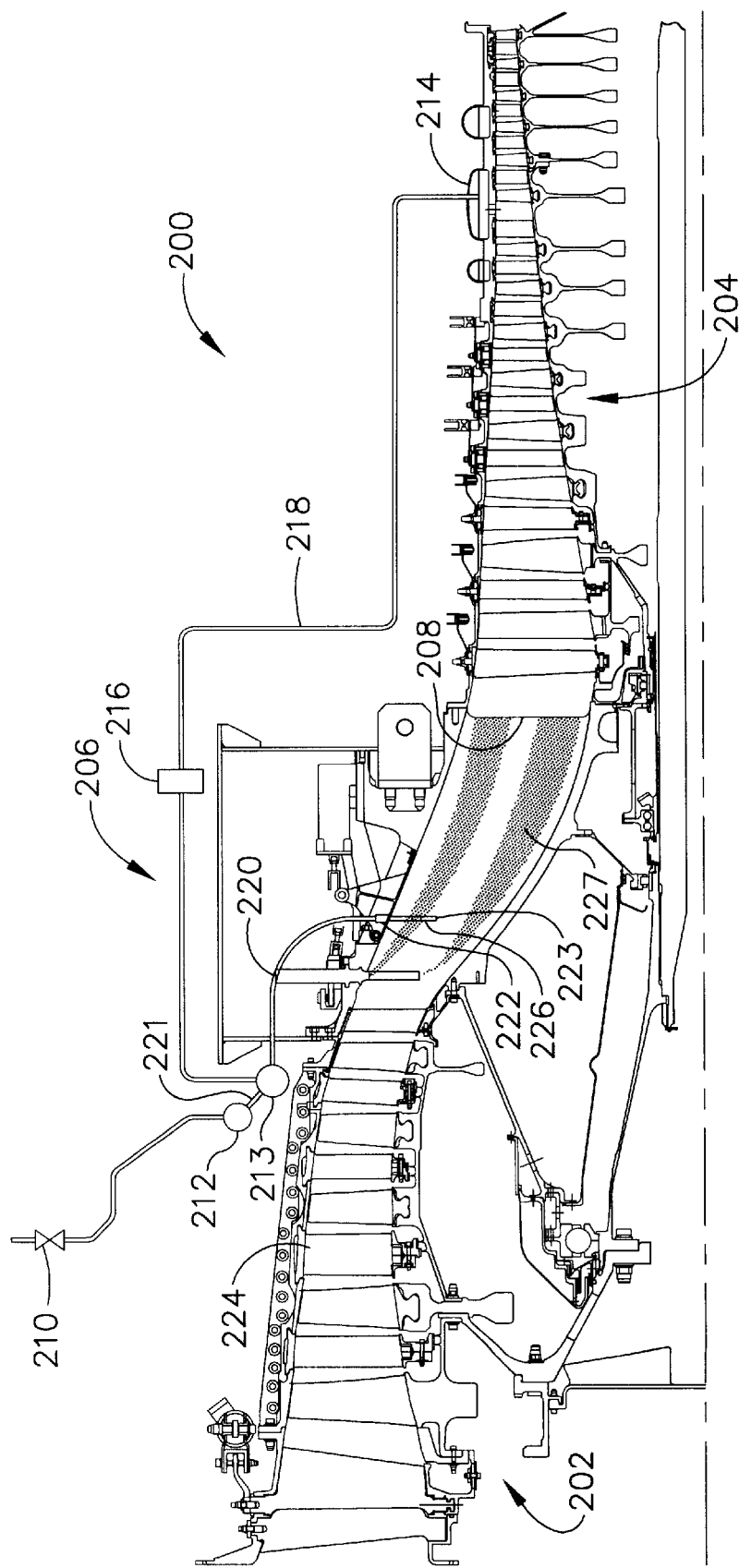
FIG. 6 is an exemplary schematic illustration of a gas turbine engine including compressor water injection in accordance with yet another embodiment of the present invention.

FIG. 6 is an exemplary schematic illustration of a gas turbine engine 200 including compressor water injection in accordance with yet another embodiment of the present invention. Engine 200 includes a low pressure compressor 202 and a high pressure compressor 204. In this embodiment, low pressure compressor 202 is a five stage compressor, and high pressure compressor 204 is a fourteen stage compressor. A combustor (not shown) is downstream from compressor 204. Engine 200 also includes a high pressure turbine (not shown) and a low pressure turbine (not shown). The high pressure turbine is a two stage turbine, and the low pressure turbine is a five stage turbine.

Engine 200 further includes a water injection apparatus 206 for injecting water into an inlet 208 of high pressure compressor 204. Water injection apparatus 206 includes a water metering valve 210 in flow communication with a water manifold 212. Water is supplied to metering valve 210 from a water source or reservoir. Air is supplied to an air manifold 213 from an eight stage bleed 214 of high pressure compressor 204. Bleed 214 serves as a source of heated air. A heat exchanger 216 is coupled to flow pipe or tube 218 which extends from eight stage bleed 214 to air manifold 213. Feeder tubes 220 and 221 extend from air manifold 213 and water manifold 212 to twenty four spray nozzles 222 and 223 radially spaced and extending through outer casing 224. Nozzles 222 are sometimes referred to herein as short nozzles 222, and nozzles 223 are sometimes referred to herein as long nozzles 223. Nozzles 222 and 223 are radially spaced around the circumference of casing 224 in an alternating arrangement as described below in more detail.

Twenty four water feeder tubes 221 extend from water manifold 212, and twenty four air feeder tubes 220 extend from air manifold 213. Each nozzle 222 is coupled to one water feeder tube 221 from water manifold 212 and to one air feeder tube 220 from air manifold 213. Generally, water flowing to each nozzle 222 and 223 is atomized using the high pressure air (e.g., at about 150 psi) taken off eight stage bleed 214 of high pressure compressor 204. The droplet diameter, in this embodiment, should be maintained at about 20 microns. Such droplet diameter is maintained by controlling the rate of flow of water through valve 210 using the water schedule described below in more detail and utilizing the high pressure air from bleed 214. Except for water spray injection apparatus 206, the various components of engine 200 are known in the art.

In operation, engine 200 is operated to its maximum power output without spray injection, i.e., water valve 210 is closed. In this mode of operation, air flows through air pipe 218 to nozzles 222 and 223. The air is cooled by heat exchanger 216. However, since no water is allowed through valve 210, no water is injected into the flow to high pressure compressor 204.

Once maximum power output is achieved, water injection apparatus is activated and water flows to nozzles 222 and 223. Heat exchanger 216 continues operating to reduce the temperature of the air supplied to nozzles 222 and 223. Particularly, the air flow from the eighth stage bleed 214 typically will be at about 600–650 degF. To reduce the thermal differential, or mismatch, between the bleed hot air and the water from the water reservoir, the temperature of the air from the eighth stage bleed 214 is reduced to about 250 degF. by heat exchanger 216 while maintaining the pressure of the air at about 150 psi. By maintaining the pressure at about 150 psi, the air has sufficient pressure to atomize the water.

Nozzles 222 and 223 inject water sprays 226 and 227 (illustrated schematically in FIG. 6) into the flow at inlet 208 of high pressure compressor 204, and the water spray enters into compressor 204 through inlet 208. Due to the high temperature environment at the location at which the water spray is injected, the water spray partially evaporates before entering high pressure compressor 204. The water spray cools the air flow in high pressure compressor 204 for at least each stage of compressor 204 through which such spray flows, i.e., until it evaporates. Usually by the sixth stage of compressor 204, the water spray is totally evaporated. The air is further compressed by high pressure compressor 204, and highly compressed air is delivered to the combustor. Airflow from the combustor drives the high pressure turbine and the low pressure turbine.

The water particles from water spray apparatus 206 provide the advantage that the temperature of the airflow at the outlet of high pressure compressor 204 (temperature T3) and the temperature of the airflow at the outlet of the combustor (temperature T41) are reduced as compared to such temperatures without the spray. Specifically, the water spray extracts heat from the hot air flowing into and through compressor 204, and by extracting such heat from the air flow, the T3 and T41 temperatures are reduced along with the required compressor power. Furthermore, as described above, additional water supplied by water spray apparatus 206 also provides the advantage of evaporative intercooling of engine 200 such that the T3 temperature operating limit is substantially eliminated from engine operation requirements. More specifically, as described in more detail below, evaporative cooling of engine 200 facilitates reducing high pressure compressor flow path temperatures, while maintaining the same flow path temperature profile. The decreased cooling temperature is then used to reduce engine component temperatures, thus facilitating extending a useful life of such components.

The above described water injection apparatus 206 may also be utilized in connection with pre-low pressure compressor water spray injection. For example, water injection apparatus 206 may also be utilized with engine 10 (shown in FIG. 1), engine 50 (shown in FIG. 2), engine 82 (shown in FIG. 3), engine 84 (shown in FIG. 4), or engine 160 (shown in FIG. 5). It is believed that such pre-low pressure compressor water spray injection provides at least many of the same advantages as the intermediate, or pre-high pressure compressor described in more detail below.

Figure 7:
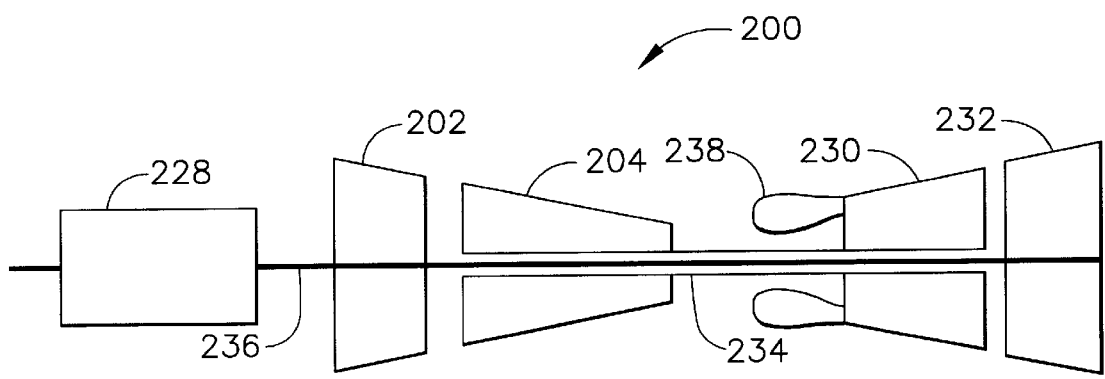
FIG. 7 is an exemplary schematic illustration of the gas turbine engine shown in FIG. 6 coupled to an electric generator.
Figure 10:
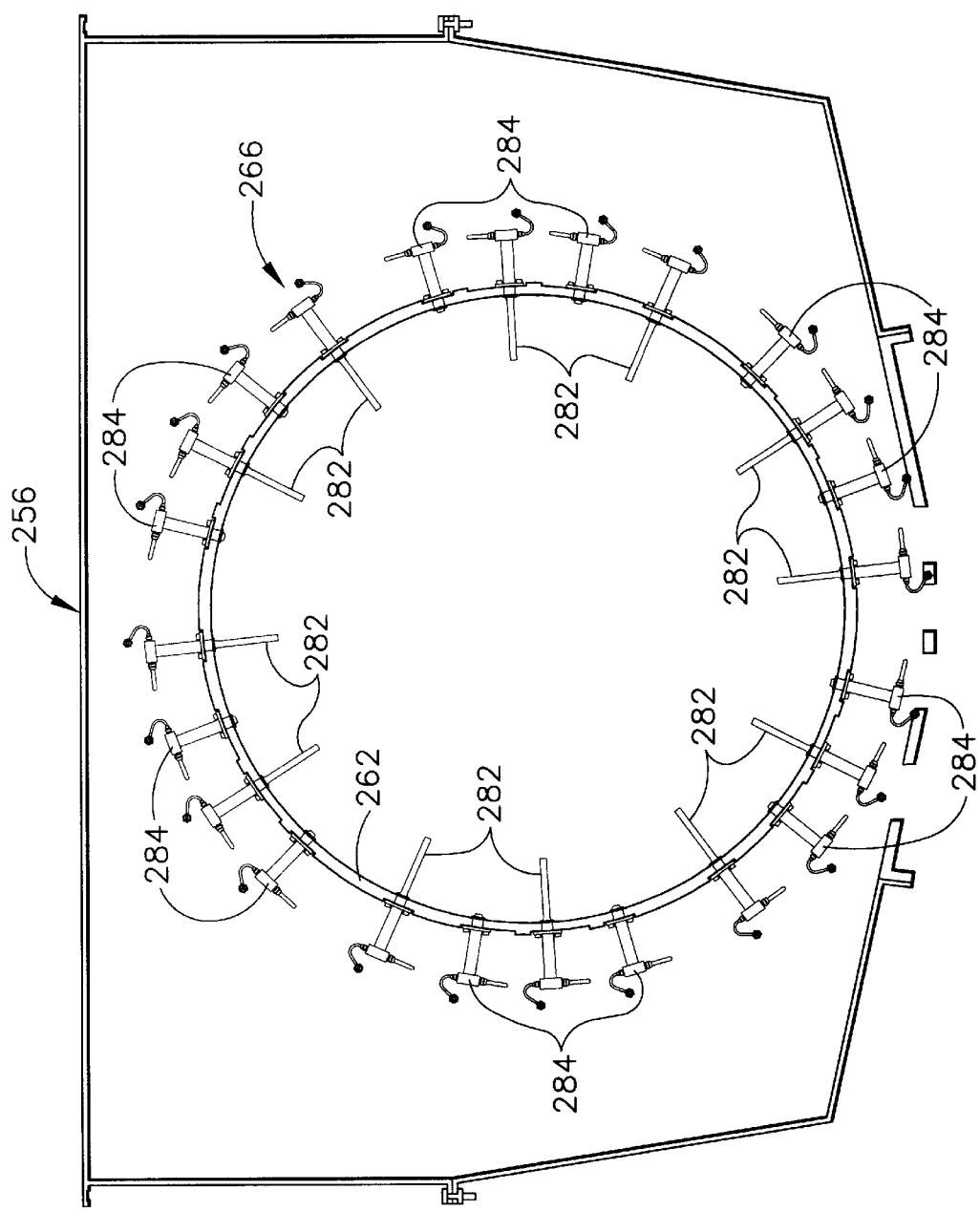
FIG. 10 is a cross sectional view of the engine shown in FIG. 8 and illustrating a nozzle configuration.
Figure 9:
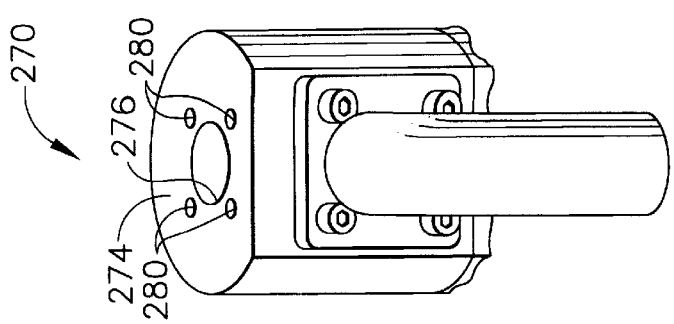
FIG. 9 is a perspective view of a connector for connecting the eight stage bleed of the engine shown in FIG. 8 to an air manifold.

FIG. 7 is a schematic illustration of gas turbine engine 200 coupled to an electric generator 228. As shown in FIG. 10, engine 200 includes a high pressure turbine 230 and a low pressure turbine 232 downstream from high pressure compressor 204. High pressure compressor 204 and high pressure turbine 230 are coupled via a first shaft 234, and low pressure compressor 202 and low pressure turbine are coupled via a second shaft 236. Second shaft 236 also is coupled to generator 228. A combustor 238 is between compressor 20 Engine 200 may, for example, be an LM6000 Gas Turbine Engine commercially available from General Electric Company, Cincinnati, Ohio, 45215, modified to include water spray injection apparatus 206 (FIG. 9).

Rather than being originally manufactured to include injection apparatus 206, it is possible that apparatus 206 is retrofitted into existing engines. Injection apparatus 206 would be provided in kit form and include tubing 218 and 220, along with water and air manifolds 212 and 213 and water metering valve 210. Nozzles 222 and 223 also would be provided. When it is desired to provide water spray injection, nozzles 222 and 223 are installed in outer casing 224 and flow tube 218 is installed and extends from eighth stage bleed 214 to air manifold 213. Valve 210 is coupled between a water source and water manifold 212, and water manifold 212 is coupled to air manifold 213.

Figure 8:
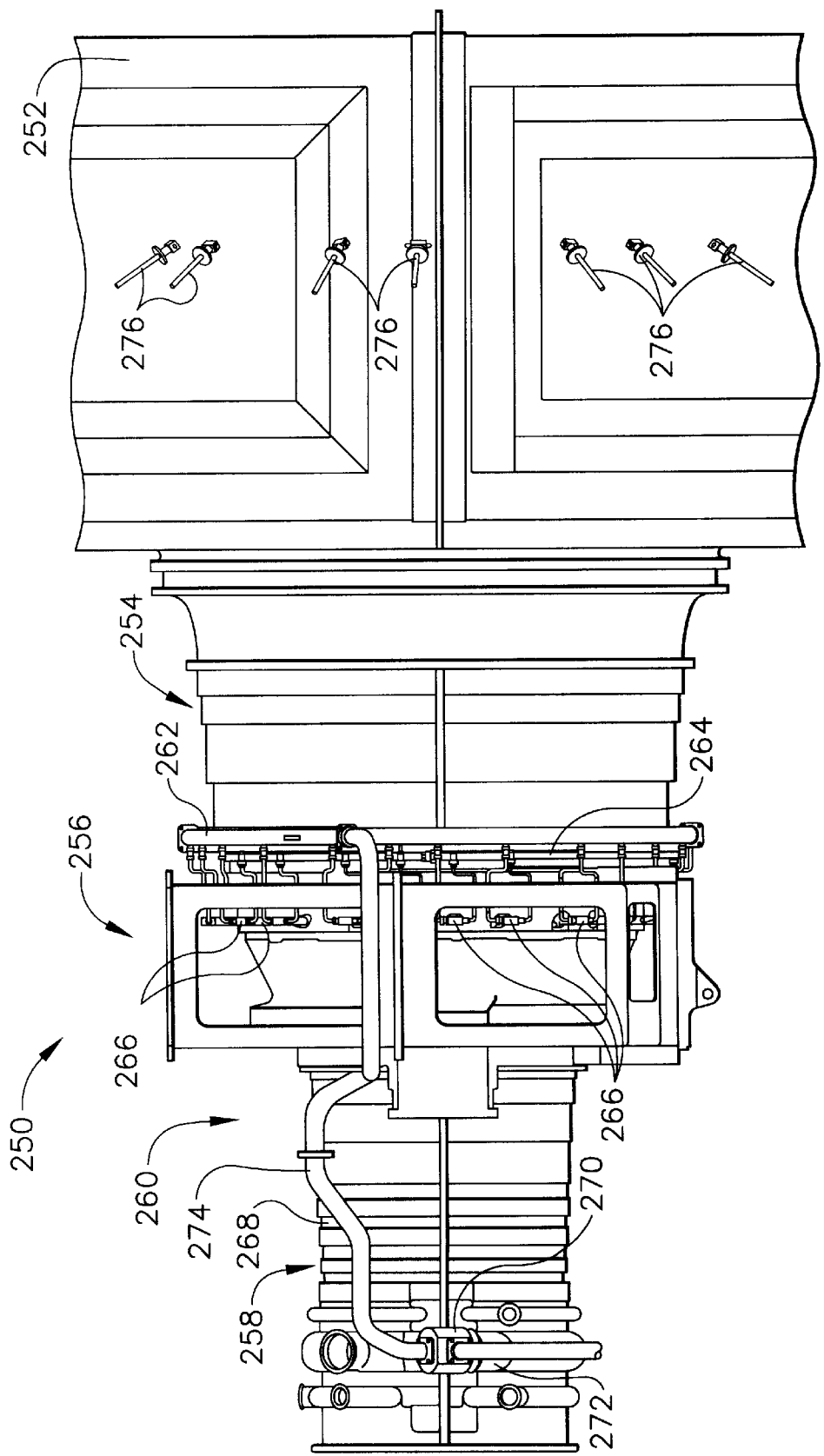
FIG. 8 is a side view of an LM6000 engine of General Electric Company modified to include spray injection.

FIG. 8 is a side view of an LM6000 engine 250 of General Electric Company modified to include spray injection. Engine 250 includes an inlet 252, a low pressure compressor 254, and front frame 256, and a high pressure compressor 258. Engine 250 is modified to include water spray injection apparatus 260, which includes an air manifold 262 and a water manifold 264 coupled to twenty four radially spaced nozzles 266 mounted to an engine outer casing 268. Nozzles 266 spray water into engine 250 at a location between low pressure compressor 254 and high pressure compressor 258. Injection apparatus 260 also includes a connector 270 for connecting to an eight stage bleed 272 of high pressure compressor 258, and a pipe 274 extending from connector 270 to air manifold 262. Although not shown in FIG. 8, a heat exchanger (air to air or water to air) may be coupled to pipe 274 to reduce the temperature of the air supplied to air manifold 262. For illustration purposes, nozzles 276 are shown secured to inlet 252 of low pressure compressor 254. Air and water manifolds also could be coupled to nozzles 276 to provide pre-low pressure compressor water spray injection. The components of injection apparatus 260 described above are fabricated from stainless steel.

High pressure compressor 258 includes stator vanes which typically are not grounded to case 268. When used in combination with water spray injection, it has been found that grounding at least some of such vanes which come into contact with the water spray may be necessary. To the extent required, and using for example, graphite grease, such vanes can be grounded to case 268. That is, graphite grease may be applied to the bearing area of such vanes. For example, such graphite grease can be used at the inlet guide vane and for each down stream vane through the second stage. In operation, a portion of the grease heats and dissipates, and the graphite remains to provide a conductive path from the vane to case 268.

It also should be understood if the water can be supplied to the water spray injection nozzles under sufficient pressure, it may not be necessary to supply high pressure air to nozzles. Therefore, it is contemplated that the eight stage bleed could be eliminated if such high pressure water is available.

FIG. 9 is a perspective view of connector 270 for connecting eight stage bleed 272 of engine 250. Connector 270 is configured to be threaded into engagement with engine casing 268 and includes an opening 274 normally closed by a bolt 276. When bleed air is desired to be provided to air manifold 262, bolt 276 is removed and pipe 274 is coupled to connector 270 using a mating flange at the end of pipe 274 that mates with surface 278 of connector 270. Bolt openings 280 enable the pipe mating flange to be bolted to connector 270.

FIG. 10 is a cross sectional view of engine 250 and illustrating nozzles 266. Nozzles 266 are configured so that water injected into the gas flow to high pressure compressor 258 provides substantially uniform radial and circumferential temperature reductions at the outlet of high pressure compressor 258. Nozzles 266 include a set 282 of long nozzles and a set 284 of short nozzles. In the configuration shown in FIG. 10, at least one short nozzle 284 is located at a radially intermediate location between two radially aligned long nozzles 282. Short nozzles 284 are about flush with the circumference of the flow path and long nozzles 282 extend about four inches into the flow path. Of course, other lengths nozzles may be utilized depending upon the desired operation results. In one specific implementation, nozzle 284 extends about 0.436 inches into the flow path, and nozzle 282 extends 3.686 inches into the flow path. The water ratio between short nozzles 284 and long nozzles 282 (e.g., 50/50) may also be selected to control the resulting coding at the compressor outlet.

The temperature sensor for obtaining the temperature at the inlet of the high pressure compressor (i.e., temperature T25), is aligned with a long nozzle 282. By aligning such temperature sensor with a long nozzle 282, a more accurate temperature measurement is obtained rather than having such sensor aligned with a short nozzle 284.

Figure 12:
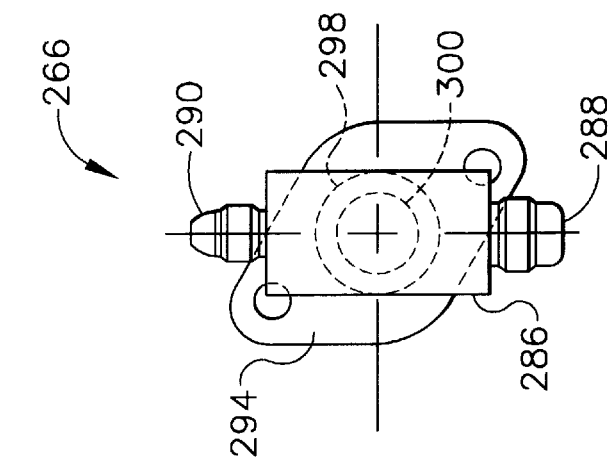
FIG. 12 is a top view of the nozzle shown in FIG. 11.
Figure 11:
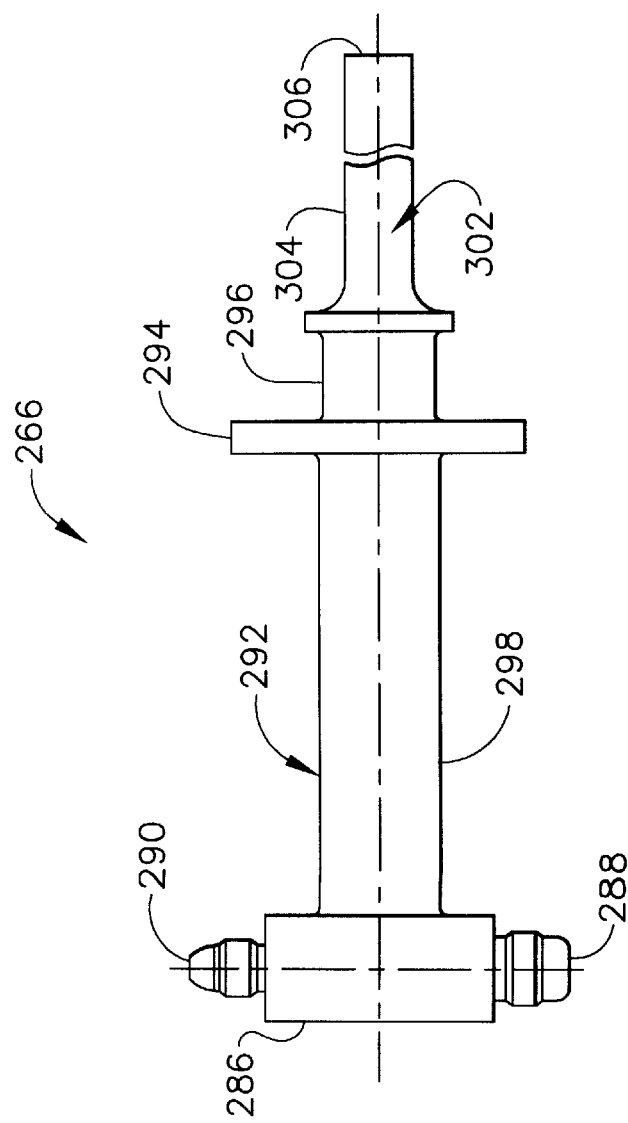
FIG. 11 is a side view of an exemplary embodiment of a nozzle.

FIGS. 11 and 12 illustrate one of nozzles 266. Long and short nozzles 282 and 284 differ only in length. Nozzle 266 includes a head 286 having an air nozzle 288 and a water nozzle 290. Air nozzle 288 couples to an air pipe (not shown) which extends from nozzle 288 to air manifold 262. Water nozzle 290 couples to a water pipe (not shown) which extends from nozzle 290 to water manifold 264. Nozzle 266 also includes a stem 292 and a mounting flange 294 for mounting nozzle 266 to case 262. A mounting portion 296 of stem 292 facilitates engagement of nozzle 266 to case 262.

Stem 292 is formed by an outer tubular conduit 298 and an inner tubular conduit 300 located within conduit 298. Air flows into nozzle 288 and through the annulus between outer conduit 298 and inner conduit 300. Water flows into nozzle 290 and through inner conduit 300. Mixing of the air and water occurs in stem portion 302 formed by a single conduit 304. An end 306 of nozzle 266 is open so that the water and air mixture can flow out from such end 306 and into the flow path.

Figure 13A:
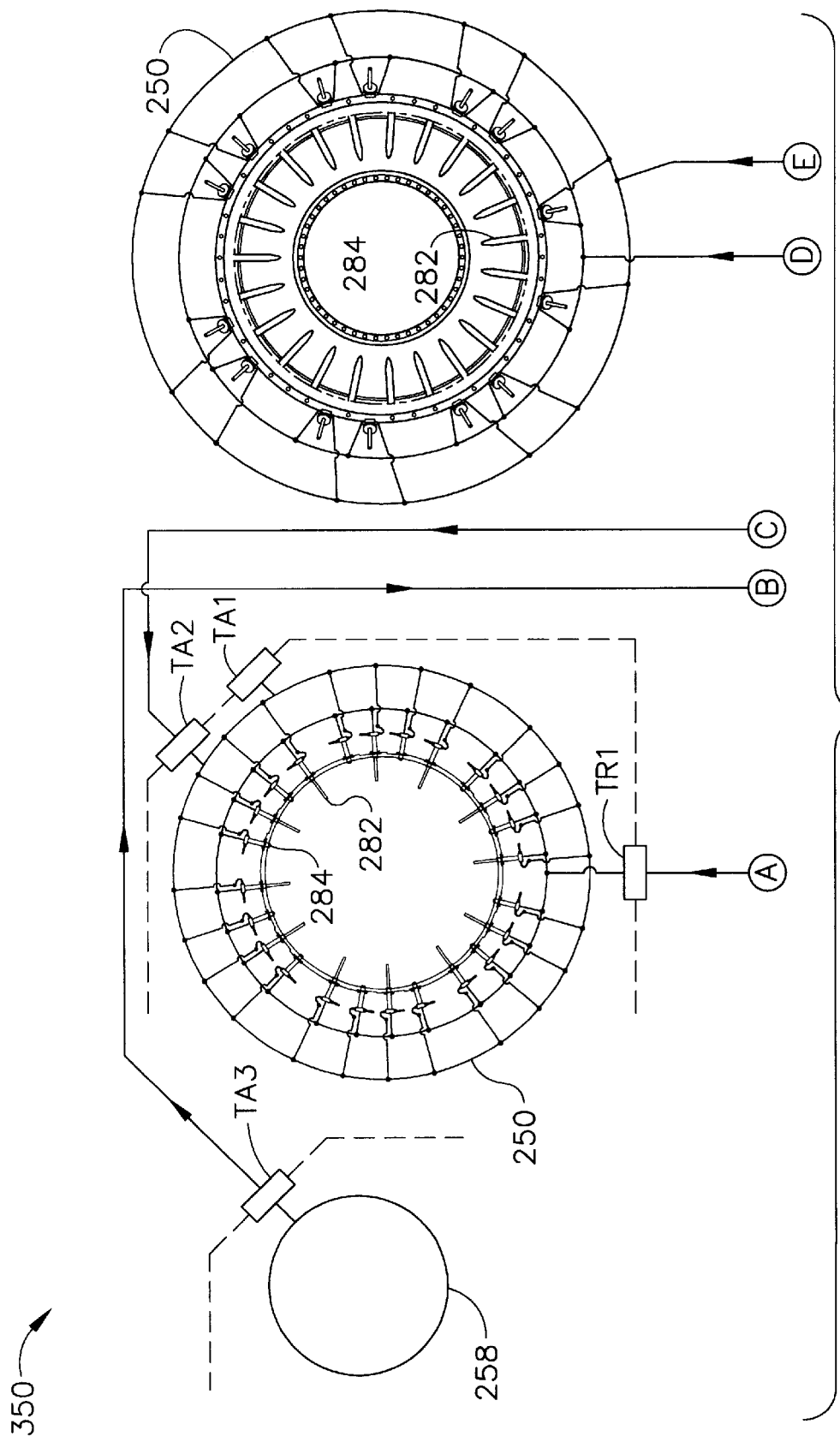
FIG. 13 is an exemplary schematic diagram of a control circuit for controlling the supply of water and air to the nozzles in the engine shown in FIG. 8.
Figure 13B:
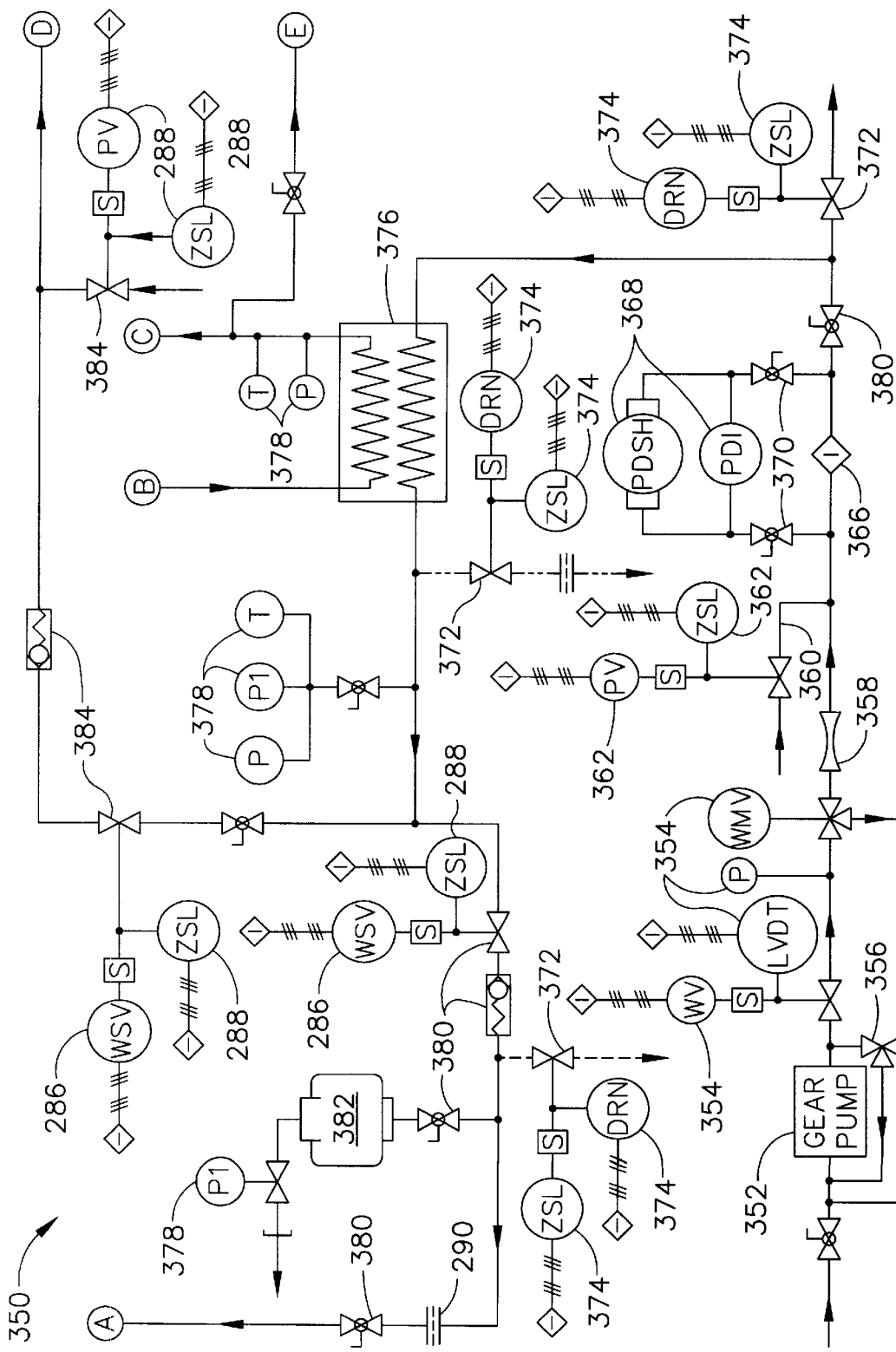

FIG. 13 is a schematic diagram of a control circuit 350 for controlling the supply of water and air to nozzles 282 and 284 in engine 250 for both frame water injection (aft looking forward) and inlet water injection (aft looking forward). As shown in FIG. 13, demineralized water is pumped through a motor driven water pump 352. Sensors 354 are coupled to the water delivery line such as a linear variable differential transformer, a pressure sensor, and a water meter valve. A relief valve 356 is connected in parallel with pump 352, and a flow meter 358 is coupled in series with pump 352. An air purge line 360 also is coupled to the water delivery line. Controls 362 for a normally closed solenoid valve control 364 air purge operations. A filter 366 also is provided in the water delivery line, and sensors 368 with valves 370 (manual hand valve-locking flag feature (normally open)) are coupled in parallel with filter 366.

Normally open valves 372, coupled to controls 374, are provided to enable water to drain from the water delivery line into a water drain system. Water in the water delivery line flows through a heat exchanger 376 which receives air from the eight stage bleed of high pressure compressor 258.

For frame water injection, multiple sensors 378 and control valves 380 control the supply of water to nozzles 282 and 284. Circuit 350 also includes a water accumulator 382. For inlet water injection, sensors 378 and control valve 384 control the supply of water to nozzles 282.

Letter designations in FIG. 13 have the following meanings.

T—temperature measurement location
P—pressure measurement location
PI—pressure indicator
N/C—normally closed
N/O—normally open
PDSW—pressure differential switch
PDI—pressure differential indicator
DRN—drain
ZS—position switch
WMV—water metering valve
PRG—purge
LVDT—linear variable differential transformer In FIG. 13, a solid line is a water supply line, a double dash line is a drain line, and a solid line with hash marks is an electrical line. Boxes identify interfaces between the water supply system and the engine. Water metering valves 286 and other control/measurement valves 288, and an orifice 290 (for inlet water injection) are utilized in connection with the control of water flow through circuit 350.

Figure 14:
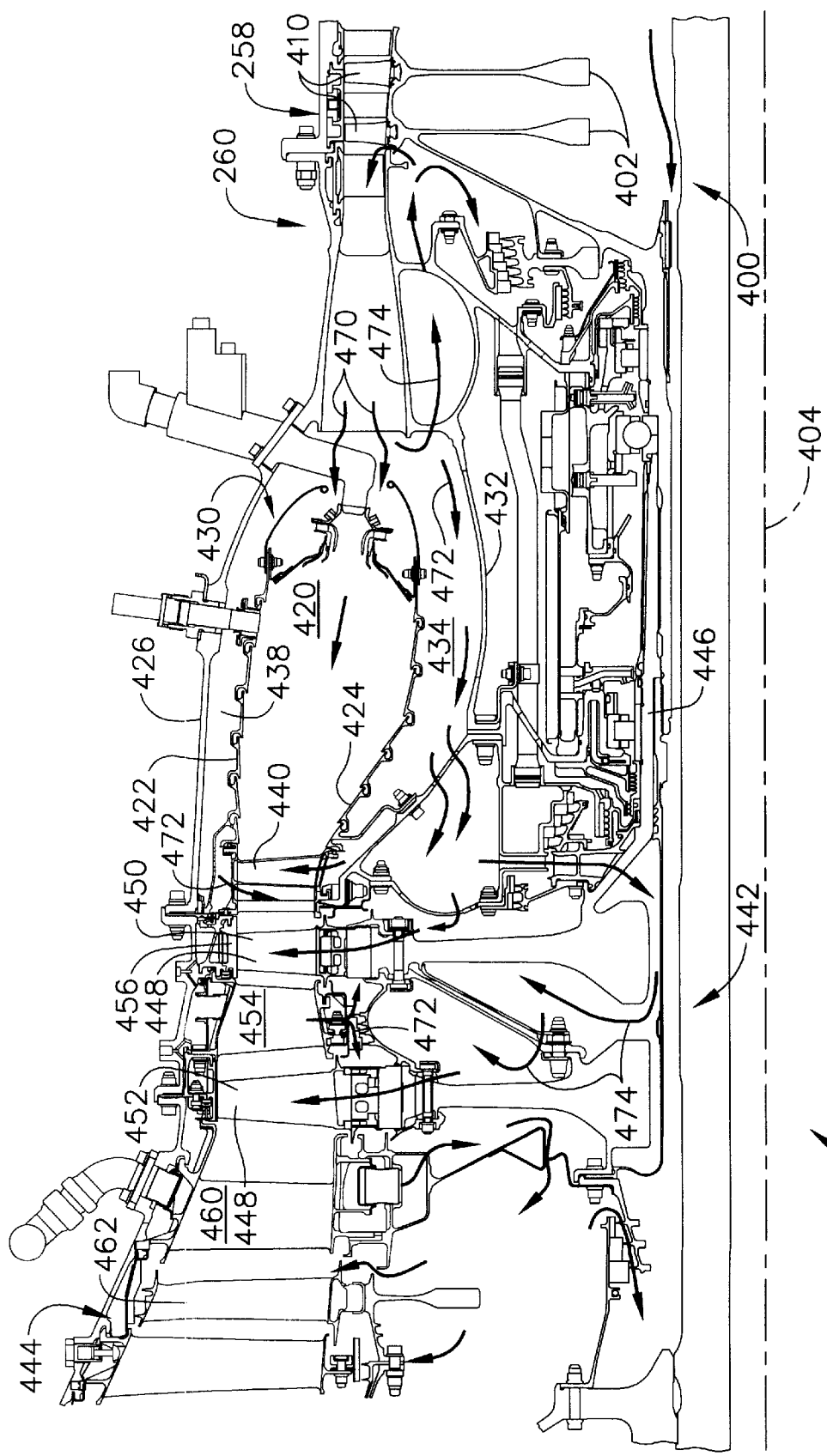
FIG. 14 is a partial cross-sectional view of the engine shown in FIG. 8.

FIG. 14 is a partial cross sectional view of engine 250. Engine 250 includes a compressor rotor assembly 400 and water spray injection apparatus 260 (shown in FIG. 8). Compressor rotor assembly 400 includes low pressure compressor 254 (shown in FIG. 8) and high pressure compressor 258. High pressure compressor 14 includes a plurality of rotors 402 coupled together coaxially with a gas turbine engine centerline axis 404. Rotors 402 extend axially along center line axis 404 from an inlet side (not shown) of high pressure compressor 258 to an exhaust side 260 of high pressure compressor 14. Each high pressure compressor rotor 402 is formed by one or more bladed disks 410 which cooperate with a motive or working fluid, such as air, and compress the motive fluid in succeeding rotor stages.

A combustor 420 is downstream from compressor 204 and includes an annular outer liner 422 and an annular inner liner 424 spaced inward from a combustor casing 426. More specifically, outer liner 422 and combustor casing 426 define an outer passageway 430, and inner liner 424 and a forward inner nozzle support 432 define an inner passageway 434. Outer and inner liners 422 and 424 extend from a inlet side 438 of combustor 420 to a turbine nozzle 440. In the exemplary embodiment, nozzle 440 is a high pressure turbine stage one nozzle.

Engine 250 includes a high pressure turbine 442 and a low pressure turbine 444 downstream from high pressure compressor 204. High pressure compressor 204 and high pressure turbine 442 are coupled via a first shaft 446, and low pressure compressor 202 and low pressure turbine 444 are coupled via a second shaft (not shown). High pressure turbine 442 includes a plurality of blades 448 extending circumferentially around center line axis 404. More specifically, a first row of blades 450, known as stage one blades, are downstream from nozzle 440, and a second row of blades 452, known as stage two blades, are downstream from a stage two nozzle 454. A high pressure turbine shroud 456 is radially outward from rotor blades 450 and extends circumferentially around turbine 442.

Low pressure turbine 444 is downstream from high pressure turbine 442 and includes a turbine nozzle 460 that directs air into low pressure turbine 442. More specifically, nozzle 460 is known as a low pressure turbine stage one nozzle, and is upstream from a first row of blades 462 known as low pressure turbine stage one blades.

During operation, engine 250 is operated to its maximum power output without spray injection. A working fluid, such as air, is compressed while flowing through low pressure compressor 254, and compressed air is supplied from low pressure compressor 254 to high pressure compressor 258. Once maximum power output is achieved, water injection apparatus 260 is activated and water is injected into engine 250. Due to the higher temperature environment at the location at which the water spray is injected, the water spray partially evaporates before entering high pressure compressor 258. The water spray cools the air flow in high pressure compressor 258 for at least each stage of compressor 258 through which such spray flows, i.e., until it evaporates. Usually by the sixth stage of compressor 258, the water spray is evaporated. The air is further compressed by high pressure compressor 258, and highly compressed air is delivered to combustor 420. Airflow from the combustor drives the high pressure turbine and the low pressure turbine.

The water particles from water spray apparatus 206 provide the advantage that the temperature of the airflow at the outlet of high pressure compressor 204 (temperature T3) and the temperature of the airflow at the outlet of the combustor (temperature T41) are reduced as compared to such temperatures without the spray. Specifically, the water spray extracts heat from the hot air flowing into and through compressor 204, and by extracting such heat from the air flow, the T3 and T41 temperatures are reduced along with the required compressor power.

Engine 250 is then increased in power using the T3 temperature as the limiting control parameter. When the T3 temperature control limit is again reached, engine power is held constant, and additional water is supplied to engine 250 at an increased flow rate using control circuit 350 (shown in FIG. 10). More specifically, the additional water injection is not utilized for power enhancement, but rather is used for evaporatively cooling engine 250 beyond the water injection schedule utilized for power enhancement. In one embodiment, control circuit 350 provides an increased water flow rate for evaporative cooling that is approximately five percent greater than a corresponding flow rate utilized for power enhancement. In another embodiment, control circuit 350 provides an increased water flow rate used for evaporative cooling that is greater than approximately five percent greater than a corresponding flow rate utilized for power enhancement. In a further embodiment, control circuit 350 provides an increased water flow rate for evaporative cooling that is between approximately five and twenty percent greater than a corresponding flow rate utilized for power enhancement.

The increased water injection results in reducing a temperature of high pressure compressor flow path 470 exiting high pressure compressor 258 while maintaining approximately the same overall engine flow path temperature profile. The increased cooling produces an engine flow path profile that is substantially similar to a dry engine, but with greatly reduced flow path outer and inner temperatures. Thus, increased cooling flows are provided which have decreased temperatures which facilitate increased cooling of engine components. More specifically, outer flow path airflow 472 is directed for cooling high pressure turbine shroud 456, high pressure turbine stage one and stage two nozzles 440 and 454, respectively, low pressure turbine stage one nozzle 460, and low pressure turbine 444. Furthermore, inner flow airflow 474 is directed for cooling high pressure compressor 204, high pressure turbine rotor assembly 442, and high pressure turbine stage one and stage two blades 450 and 452, respectively. The increased cooling facilitates reducing operating temperatures of engine components, thus facilitating extending a useful life of such components.

FIG. 15 is a chart illustrating an exemplary water schedule for power augmentation of engine 250. The amount of water supplied to the nozzles for power augmentation varies depending, for example, on the ambient temperature as well as the size of the desired droplets. Accordingly, amount of percent increase of water supplied to the nozzles for evaporative cooling also varies. A droplet size of 20 microns has been found, in at least one application, to provide the acceptable results. Of course, the operating parameters of the engine in which water spray injection is utilized, the desired operating parameters, and other factors known to those skilled in the art affect the amount of water spray injection.

While the invention has been described in terms of various specific embodiments, those skilled in the art will recognize that the invention can be practiced with modification within the spirit and scope of the claims.

What is claimed is:

1. A method for operating a gas turbine engine including a high pressure compressor and a water injection apparatus for injecting water into a flow of the engine upstream from the high pressure compressor, said method comprising the steps of:

operating the engine without injecting water into the gas flow of the engine;

injecting water into the gas flow at a first flow rate for power augmentation once engine full power is about reached; and injecting water at an increased second flow rate into the engine to evaporative cool engine components downstream from the high pressure compressor; wherein said method further includes the step of injecting water through a circumferential manifold having a plurality of alternating radially-inward extending long and short nozzles, each of said short nozzles being positioned substantially in-between two long nozzles.

2. A method in accordance with claim 1 further comprising the step of increasing fuel flow to the engine after the water is injected into the engine at the first flow rate.

3. A method in accordance with claim 1 wherein said step of injecting water at an increased second flow rate further comprises the step of maintaining engine power approximately constant when water is injected into the engine at the increased second flow rate.

4. A method in accordance with claim 1 wherein said step of injecting water at an increased second flow rate further comprises the step of injecting water at a flow rate that is at least five percent greater than a corresponding water first flow rate injected for power augmentation.

5. A method in accordance with claim 1 wherein said step of injecting water at an increased second flow rate further comprises the step of reducing a temperature of high pressure compressor flow path air used for cooling.

6. A method in accordance with claim 1 wherein the engine includes a low pressure compressor, said step of injecting water at an increased second flow rate further comprises the step of injecting water into the engine upstream from the low pressure compressor.

7. A method in accordance with claim 1 wherein the engine includes a low pressure compressor, said step of injecting water at an increased second flow rate further comprises the step of injecting water into the engine intermediate the low pressure compressor and the high pressure compressor.

8. A method for operating a gas turbine engine, said method comprising the steps of:

injecting water into the gas flow at a first flow rate for power augmentation once engine full power is about reached;

accelerating the engine to full power while water is injected at the first flow rate; and injecting water at a second flow rate into the engine for evaporative cooling of engine components while the engine is maintained at a substantially constant operating power; wherein said method further includes the step of injecting water through a circumferential manifold having a plurality of alternating radially-inward extending long and short nozzles, each of said short nozzles being positioned substantially in-between two long nozzles.

9. A method in accordance with claim 8 wherein said step of injecting water at a second flow rate further comprises the step of injecting water at a second flow rate that is at least five percent greater than the first flow rate.

10. A method in accordance with claim 9 wherein the engine includes a water injection apparatus, said step of injecting water into the gas flow further comprises the step of injecting water into the engine through the water injection apparatus.

11. A method in accordance with claim 10 wherein said step of injecting water at a second flow rate further comprises the step of injecting water into the engine at the second flow rater through the water injection apparatus.

12. A method in accordance with claim 10 wherein the engine includes a high pressure compressor, said step of injecting water into the gas flow at a first flow rate further comprises the step of injecting water upstream from the high pressure compressor.

13. A method in accordance with claim 10 wherein the engine includes a high pressure compressor and a low pressure compressor upstream from the high pressure compressor, said step of injecting water into the gas flow at a first flow rate further comprises the step of injecting water upstream from the low pressure compressor.

14. A method in accordance with claim 10 wherein the water injection apparatus includes a plurality of nozzles extending circumferentially around the engine in between a low pressure compressor and a high pressure compressor, said step of injecting water into the gas flow further comprises the step of injecting water into the gas flow through the nozzles.

15. A method for operating an engine including a high pressure compressor and a water injection system including a plurality of nozzles, said method comprising the steps of:

operating the engine at full power without injecting water into the gas flow of the engine;

injecting water through the nozzles into the gas flow at a first flow rate for power augmentation once engine full power is about reached;

accelerating the engine to full power while water is injected at the first flow rate; and injecting water at a second flow rate through the nozzles into the engine for evaporative cooling of engine components while the engine is maintained at a substantially constant operating power, wherein the second flow rate is at least approximately five percent greater than a corresponding water injection first flow rate used for power augmentation; wherein said method further includes the step of injecting water through a circumferential manifold having a plurality of alternating radially-inward extending long and short nozzles, each of said short nozzles being positioned substantially in-between two long nozzles.

16. A method in accordance with claim 15 wherein the engine includes a low pressure compressor upstream from the high pressure compressor, said step of injecting water through the nozzles into the gas flow at a first flow rate further comprises the step of injecting water into the engine upstream intermediate the low and high pressure compressors.

17. A method in accordance with claim 15 wherein the engine includes a low pressure compressor upstream from the high pressure compressor, said step of injecting water through the nozzles into the gas flow at a first flow rate further comprises the step of injecting water into the engine upstream from the low pressure compressor.

\* \* \* \* \*